United States Patent
Carcaterra et al.

(10) Patent No.: US 9,765,754 B2
(45) Date of Patent: Sep. 19, 2017

(54) APPARATUS FOR THE GENERATION OF WAVES IN THE MARINE ENVIRONMENT BY MEANS OF IMPACTING PISTONS AND GAS, HYDRAULIC, VAPOUR AND ELECTROMAGNETIC LAUNCHING SYSTEM FOR ACQUISITION OF SEISMIC DATA

(75) Inventors: Antonio Carcaterra, Rome (IT); Davide Calcagni, Cislago (IT); Stefano Carlo Luigi Sandroni, Cassano D'adda (IT); Francesca Gaia Brega, Milan (IT)

(73) Assignee: ENI S.P.A. (IT)

( * ) Notice: Subject to any disclaimer, the term of this patent is extended or adjusted under 35 U.S.C. 154(b) by 501 days.

(21) Appl. No.: 13/885,538

(22) PCT Filed: Nov. 24, 2011

(86) PCT No.: PCT/EP2011/073987
§ 371 (c)(1),
(2), (4) Date: Jul. 10, 2013

(87) PCT Pub. No.: WO2012/069611
PCT Pub. Date: May 31, 2012

(65) Prior Publication Data
US 2013/0291715 A1 Nov. 7, 2013

(30) Foreign Application Priority Data
Nov. 26, 2010 (IT) .............................. MI2010A2201

(51) Int. Cl.
*G01V 1/135* (2006.01)
*G01V 1/145* (2006.01)
(Continued)

(52) U.S. Cl.
CPC .............. *F03B 17/00* (2013.01); *G01V 1/133* (2013.01); *G01V 1/135* (2013.01); *G01V 1/137* (2013.01); *G01V 1/145* (2013.01)

(58) Field of Classification Search
CPC ........ G01V 1/135; G01V 1/145; G01V 1/147; G01V 1/133
(Continued)

(56) References Cited

U.S. PATENT DOCUMENTS 3,394,775 A 7/1968 Cole et al.
3,741,333 A 6/1973 Muniz et al.
(Continued)

*Primary Examiner* — Edelmira Bosques
*Assistant Examiner* — Richard Drake
(74) *Attorney, Agent, or Firm* — Tarolli, Sundheim, Covell & Tummino LLP

(57) ABSTRACT

Apparatus for the generation of pressure waves for seismic surveys in marine environment comprising a cylinder (3), defining an axis, in which a striker piston (1) and a pump piston (2) are situated, each having two respective opposite sides with respect to said axis, of which a side of the striker piston (1) situated in front of the pump piston (2) is defined first impact side, and a side of the pump piston (2) in front of the striker piston (1) is defined second impact side, the pump piston (2) and the striker piston (1) sliding in the cylinder (3) in a direction parallel to the axis, and the pump piston (2) and striker piston (1) being such as to strike against each other, by means of the first and the second impact sides, the striker piston (1) being driven by activation means pressing on the side opposite to its own impact side, wherein the cylinder (3) comprises, at one of its ends, a chamber (15) having a diameter larger, smaller or equal to that of the portion of cylinder (3) in which the striker piston (1) is housed, wherein in said chamber (15) a part of the pump piston (2) can slide, communication passages which connect the chamber (15) with the water of the marine environment (10), so as to transmit an impulse generated by said impact to the marine environment.

10 Claims, 3 Drawing Sheets

(51) Int. Cl.
*F03B 17/00* (2006.01)
*G01V 1/137* (2006.01)
*G01V 1/133* (2006.01)

(58) Field of Classification Search
USPC .................................................. 181/115, 120
See application file for complete search history.

(56) References Cited

U.S. PATENT DOCUMENTS

| | | | |
|---|---|---|---|
| 4,188,610 A | 2/1980 | Nelson et al. | |
| 4,303,141 A * | 12/1981 | Pascouet | G01V 1/133 181/115 |
| 4,327,813 A * | 5/1982 | Manin | G01V 1/133 181/115 |
| 4,571,484 A * | 2/1986 | Singfield | G01V 1/133 122/40 |
| 4,811,815 A * | 3/1989 | Meier | G01V 1/133 181/120 |
| 4,885,727 A * | 12/1989 | Auger | G01V 1/137 181/120 |
| 2008/0009788 A1* | 1/2008 | Hunter | A61M 5/3007 604/68 |
| 2012/0113756 A1* | 5/2012 | Carcaterra | G01V 1/3843 367/144 |

* cited by examiner

APPARATUS FOR THE GENERATION OF WAVES IN THE MARINE ENVIRONMENT BY MEANS OF IMPACTING PISTONS AND GAS, HYDRAULIC, VAPOUR AND ELECTROMAGNETIC LAUNCHING SYSTEM FOR ACQUISITION OF SEISMIC DATA

RELATED APPLICATION

This application is a National Phase filing of PCT/EP2011/070987, filed Nov. 24, 2011, and claims priority to Italian Application No. MI2010A02201, filed Nov. 26, 2010, the subject matter of which are incorporated herein by reference in their entirety

FIELD OF THE INVENTION

The present invention relates to an apparatus for the generation of pressure waves for seismic surveys in marine environment, for example in hydrocarbons exploration.

STATE OF THE ART

Systems known as air-guns are widely adopted in the state of the art for marine geoseismic surveys, normally used in swarms or series or convoys, generally indicated as arrays. An air-gun array produces pressure waves obtained by the instantaneous release of high-pressure air in marine environment.

The air-guns must be suitably arranged and activated in a synchronized way so that the sum of the pressure signals generated by each single gun of the array can cause the cancellation of the oscillating effects in the pressure field irradiated. This generally leads to disadvantages with respect to the easiness of their use, in particular in some marine environments, for example those in which there is floating ice.

Air guns generate pressure waves by expanding compressed gas, supplied by a suitable compressor onboard a ship, directly in the water. This causes disadvantages as they require a continuous supply of air and a compressor. Furthermore, the gas bubble which generates the acoustic wave is dispersed in water, with a consequent enormous consumption of gas. Another disadvantage is due to the fact that the pressure wave generated oscillates with time, and this characteristic jeopardizes the efficiency of the geoseismic analysis of the signals reflected by the sea floor.

These disadvantages make the air-gun system unsuitable for being adopted on small-dimensioned underwater navigating units as they cannot be provided with continuous air supplies to be processed by a compressor and also because the storage of pre-compressed gas in a tank, for reasons of weight and encumbrance linked to the considerable gas consumption, is not practical on these vehicles and furthermore, during the functioning of the air-gun, the weight of the storage tank diminishes, radically changing the floating conditions of the vehicle, necessitating the use of compensation tanks. Finally, the oscillating characteristic of the pressure signal makes a single source of the air-gun type unusable. These, in fact, must be used in groups and each source of the array must have different dimensional characteristics, consequently by exploiting the possible phase shift between these sources, which have pulsations of the air bubble emitted slightly different from each other, a cancellation effect of the pressure oscillations can be obtained, maintaining only the initial pressure peak coherent for all the sources used.

SUMMARY OF THE INVENTION

In order to overcome the above drawbacks, an apparatus is envisaged for the generation of pressure waves which, according to claim 1, comprises a cylinder which defines an axis, in which a striker piston and a pump piston are housed, each of them equipped with two opposite sides with respect said axis, wherein a side of the striker piston situated in front of the pump piston is defined first impact side, and a side of the pump piston in front of the striker piston is defined second impact side, the pump piston and the striker piston sliding in the cylinder in a direction parallel to the axis, and the pump piston and striker piston being such as to strike against each other, by means of the first and the second impact sides, the striker piston being driven by activation means pressing on the side opposite to its own impact side, wherein the cylinder comprises, at one of its ends, a chamber having a diameter different from that of the portion of cylinder in which the striker piston is housed, wherein in said chamber a part of the pump piston can slide, this chamber being equipped with communication passages which connect the chamber with the water of the marine environment, so as to transmit an impulse generated by said impact to the marine environment.

The apparatus object of the invention is capable of releasing a high-intensity pressure wave only produced by the impact between two impacting pistons, with the considerable advantage that it does not consume air or any other gas for its functioning and does not pollute as it does not release air or any other gas into the water.

The pressure waves are obtained by the sole impact between two coaxial pistons housed in a cylindrical tube, the first piston being thrust against the second which is in contact with the water of the marine environment and which, due to the impact, emits a pressure impulse.

The apparatus generates pressure waves having a very short acoustic emission and high intensity which are not followed by pressure oscillation phenomena as occurs in the devices known in the state of the art.

It can be advantageously used in cases in which a conventional seismic marine source is not considered advantageous or technically impossible to use, or when pressure emissions are required of the impulsive type, with no residual oscillations.

A further advantageous application of the apparatus is the possibility of using it onboard underwater vehicles for geoseismic use, for example for oil, or other hydrocarbons explorative surveys.

It also has the advantage of being operated without the necessity of having contact with the atmosphere, as in none of its particular embodiments does it require the external supply of air or any other gas.

Furthermore, as the energy source forming part of the apparatus of the invention is characterized by a purely impulsive pressure emission which does not produce pressure oscillations, it also has the advantage of being able to be used individually and not necessarily in the form of an array as in the case of air-guns.

The apparatus for the generation of waves of the invention has two main parts:

an impact piston device and an activation system of the impact piston device which can exploit four different types of activation means (i) with gas, (ii) hydraulic, (iii) with vapour, (iv) electromagnetic.

The impact piston device comprises a cylinder in which two pistons slide: the first piston, called striker piston, activated by the activation means, is thrust at a high velocity against a second piston, called pump piston, situated at a suitable distance from the first piston, which, on the surface opposite to that struck by the striker piston, communicates with the water of the marine environment; the impact of the striker piston on the pump piston produces a high acceleration of the latter thus releasing a high-intensity pressure disturbance until it is stopped by the counter-pressure generated by the seawater on the side of the piston opposite to that which has been struck.

The launching process of the striker piston allows the kinetic energy produced by the working pressure of the activation means during the run of the striker, to be accumulated in the striker piston, said kinetic energy being released to the pump piston during the impact in very short times, i.e. in the order of fractions of thousandths of seconds. This impact allows an extremely high pressure peak to be released into the water, which can be over 1,000 bar, this peak being much greater with respect to the activation pressure of the striker piston, which is typically around a few tens of bar; the device can also produce an excitation acoustic frequency band which can vary from hundreds to thousands of Hertz.

A regulation of the activation means allows qualitatively different pressure waves to be supplied in terms of intensity and frequency band of signal emission.

Thanks to its limited dimension and the absence of air supply from the atmosphere, the apparatus of the invention is particularly suitable for being used onboard autonomous underwater vehicles having small dimensions which can navigate underwater.

When the activation means is a gas, the same mass of gas is always used as the expanded gas is not released into the water, each time suitably compressing it by separating water and air (or other gas) through a suitable piston (striker piston) which serves to both generate the impact (in its direct motion) and also to recompress the gas (in its retro-motion), using a second piston (pump piston) to generate a pressure impulse in the marine environment following the impact, said impulse being much greater than that obtained by expanding the air directly in contact with the water, as in the air-guns of the known art. Furthermore, this method of pressure generation by means of an impact between the pistons generates a purely impulsive signal with no oscillations.

When the activation means is a liquid pressurized by means of pumps, i.e. with a purely hydraulic system, the apparatus can exploit the same liquid in which the source is immersed, seawater, for example.

If the activation means is over-heated vapour, a water suction system of seawater from the marine environment is also envisaged, which causes an over-heating of said water to produce vapour under pressure which is then sent to the cylinder in which the striker piston runs.

SHORT DESCRIPTION OF THE FIGURES

Figure 1:
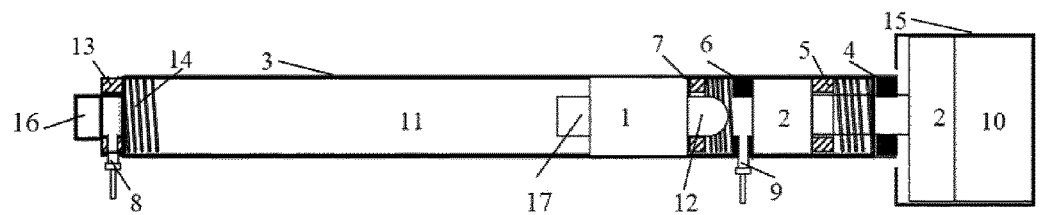
FIG. 1 represents a section on a longitudinal axial plane of a device which is part of the apparatus for the generation of pressure waves of the invention of FIGS. 5, 6, 7 and 8.
Figure 2:
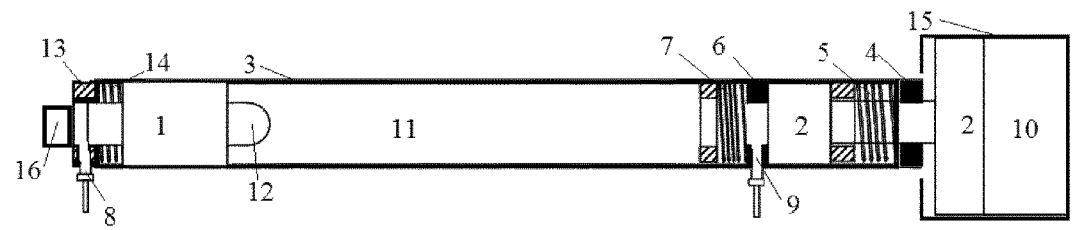
FIG. 2 represents the device of FIG. 1 during an operative phase.
Figure 3:
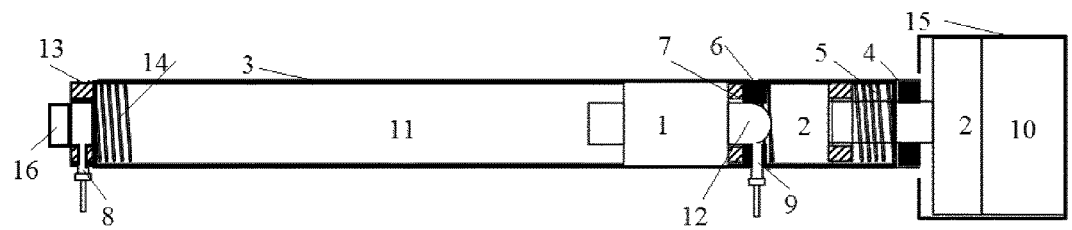
FIG. 3 represents the device of FIG. 1 during an operative phase different from that of FIG. 2.
Figure 4:
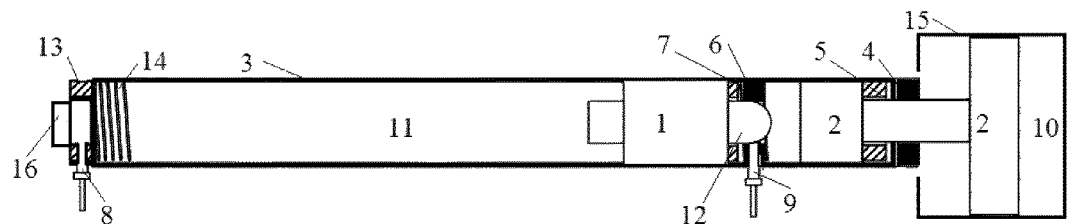
FIG. 4 represents the device of FIG. 1 during an operative phase different from that of FIGS. 2 and 3.

DESCRIPTION OF PREFERRED
EMBODIMENTS OF THE INVENTION IMPACT
PISTON DEVICE

With particular reference to FIGS. 1 to 4, these illustrate the impact piston device for the generation of pressure waves. The cylinder 3, also called thrust pipe, is equipped with two pistons: the striker piston 1 and the pump piston 2, the latter comprising two bodies integral with each other, one sliding in the cylinder 3, the other in the cylinder 15, said cylinder being integral with each other and possibly having a different radius of each other. The striker piston 1 is thrust against the pump piston 2 by means of a pressurized fluid, acting on the left side of the striker piston, and introduced into the volume 11 of tube 3 by means of the admission opening 8 or, in an embodiment of the apparatus, also by means of electromagnetic forces. A very low pressure is applied on the right side of the striker piston 1, as the volume of the cylinder 3, between the striker piston 1 and the piston 2, has been emptied, said emptying being obtained by the evacuation of fluid through the opening connected to a pumping system. The piston 1, initially positioned at the left end of the cylinder 3, in the operative phase illustrated in FIG. 2, under the action of the pressurized fluid supplied through the opening 8, accelerates during the operative phase illustrated by FIG. 3 and strikes the piston 2 at a high velocity through the impact ogive 12, in the operative phase illustrated in FIG. 4, whose form and dimensions allow the pump piston 2 to be struck before the body of the striker piston 1 reaches and is buffered against the stops 6, integral with the cylinder 3, and equipped with elastic damping elements 7. At the moment of impact, the striker piston 1 releases its kinetic energy to the piston pump 2. The pump piston, due to the impact, acquires, within a few fractions of a second, a velocity close to that of the striker piston before the impact, so that the pump piston 2 undergoes an extremely high acceleration, which generates, on the left surface of the pump piston which slides inside the cylinder 15 in communication with the water of the marine environment 10, a pressure impulse which propagates until it exits towards the marine environment. After the impact, the pump piston 2 exerts a short stoppage run, slowed down by the very high counter-pressure generated on its surface by the seawater. In this run, the pump piston 2 releases all of its kinetic energy into the water in the form of an acoustic shock wave.

The striker piston 1, due to the impact, completely loses its speed and is blocked by the run-end stops 6, equipped with suitable elastic damping elements 7. It should be noted that the kinetic energy associated with the impact on the stops 6 is of a modest entity. This, in fact, is the energy conferred to the striker piston by the work of the pressure of the pressurized fluid made in the small residual expansion which intervenes between the impact and stoppage of the pump piston. The pump piston 2, during the run between the impact undergone with the impact ogive 12 of the striker piston 1 and its stoppage against the stops 4, integral with the cylinder 3, completely transforms its kinetic energy into acoustic pressure energy released in the cylinder 15 and therefore into the marine environment 10. In this way there is no significant residual kinetic energy at the stoppage, which occurs at the run-end 4, also in this case equipped with elastic elements 5.

The pump piston 2 then returns to its seat, i.e. buffered against the stops 6, due to the effect of the hydrostatic pressure coming from the marine environment 10 and under the effect of the thrust of the elastic elements 5. The residual kinetic energy at the stoppage is also in this case of a modest entity, due to both the modest hydrostatic overpressure values and the reduced run of the piston to recover the stand-by position. The impact piston device operates in immersion and therefore the surrounding marine environment has a pressure linked to the hydrostatic head associated with the immersion level.

The pump piston 2, as can be seen in FIG. 1, is also equipped with two bodies having a different section, inserted in the cylinders 3 and 15 respectively: the first body, having a smaller or larger section with respect to the second body slides in the cylinder 3. FIG. 1 shows, for illustrative purposes, the case in which the diameter of the cylinder 15 is larger than the diameter of the cylinder 3. The second body slides in the cylinder 15 facing the water of the marine environment 10. The reason for this difference in section is due to the fact that in this way the stoppage run of the pump piston can be effectively increased or reduced, allowing this to communicate the acoustic energy with ampler or more modest axial movements, and, once the acoustic energy to be released into the water and its spectral characteristics have been established, this difference in section allows the masses of the pistons, the free run of the striker and feeding pressure of the pressurized fluid to be most adequately selected for the constructive requirements of the device. An example of dimensioning of a preferred embodiment of the impact piston device is provided in the following table.

| Characteristic Size | Range of Values |
| --- | --- |
| Stoppage free run of the pump piston | 2 cm-20 cm |
| Radius of the pump piston—cylinder 15 | 2 cm-10 cm |
| Radius of the striker piston—cylinder 3 | 2 cm-10 cm |
| Radius of the pump piston—cylinder 3 | 2 cm-10 cm |
| Mass of the striker piston | 2 kg-20 kg |
| Mass of the pump piston | 2 kg-20 kg |
| Pressure of the pressurized fluid | 5 bar-100 bar |
| Temperature of the pressurized fluid | 5-40 C |

These values can be varied by small quantities without being excluded from the scope of the invention.

The main functioning phases of the device, described above, are illustrated in FIGS. 2, 3, 4.

The repositioning phase of the striker piston in the thrust pipe 3, is effected by pressurized water injected through the adduction opening 9, with a higher pressure than that in force in the volume 11. Under the action of the pressure difference, the striker piston 1 follows a retrograde movement until it reaches the run-end 13 equipped with elastic stops 14 which also act as dampers. When the opening 8 has been closed by means of a suitable valve illustrated hereunder, the volume of the cylinder 3 filled with water, is then emptied by sucking the water through the opening 9, connected to an emptying pump described hereunder, and producing the vacuum in said volume. During the emptying, the striker piston 1 is held in position by means of the electromagnet 16 which attracts the cylinder 17 which is part of the striker 1. At this point, the device is ready for a new sound emission.

Activation System of the Striker Piston Device

As mentioned above, this activation system can exploit various activation means, which can all be combined alternatively, or jointly, with the impact piston device described above.

Figure 5:
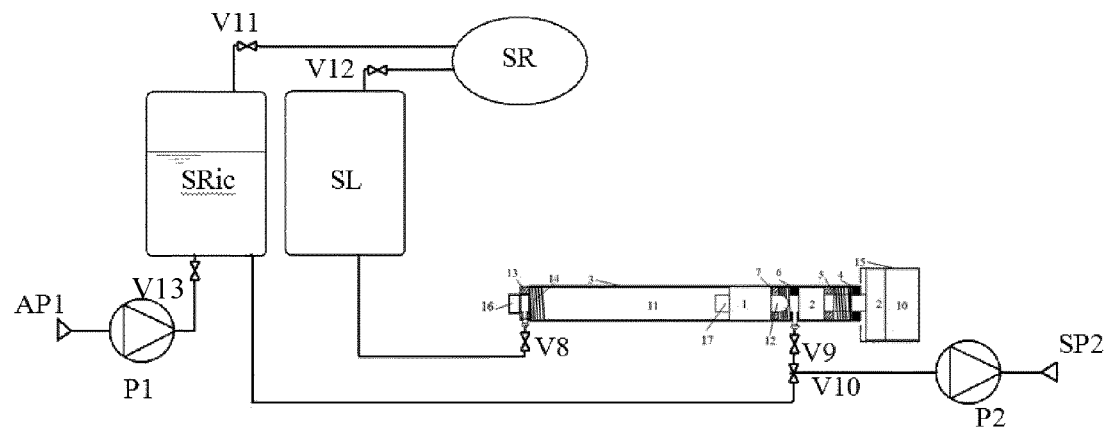
FIG. 5 represents a scheme of a first embodiment of the apparatus of the invention.

When the activation means consist of a gas, the system is represented in FIG. 5. In this embodiment, the activation system of the impact piston device envisages three tanks: a reintegration tank SR, containing only high-pressure gas with a reference value of about 400 bar, a thrust tank SL containing only gas with a reference value of about 50 bar, a recharging tank Sric containing gas and water with a reference pressure of about 55 bar.

The thrust tank SL contains pressurized gas for the feeding of the striker piston 1. In the phase prior to the thrust, the valves V8, V11, V12, V13, V9, V10 are closed and the electromagnet, which withholds the striker piston, is activated. At the moment of the launch, the valve V8 is opened, this puts the tank SL in communication with the striker piston 1 which slides in the cylinder 3 and the electromagnet 16, which releases the striker piston 1, is simultaneously disabled. The piston 1 runs until it strikes the pump piston 2 which releases the pressure impulse. At the end of this phase, the valve V9 is opened and the commutation valve V10 opens the communication between the tank SRic with the valve V9, blocking however the pressure communication towards the emptying pump P2. The piston 1 withdraws towards the run-end 13 under the action of the pressurized water contained in the tank SRic, recompressing the gas contained in the volume 11 of the cylinder 3 and transferring the gas contained in 11 to the thrust tank SL. At the end of the run of the striker piston 1 on the stops 13, the valve V8 is closed and the anchoring electromagnet 16 draws the cylinder 17 allowing the striker piston 1 to maintain its run-end position.

The valve V10 commutes by putting V9 in communication with the pump P2 and closing the line which leads to the tank SRic. The pump P2 is started, emptying the water contained in the cylinder 3 which is sent to the marine environment by means of the discharge SP2. At the end of this phase, the valve V9 is closed and the valve V10 commutes again, closing the line which leads to the pump P2 and opening the line which puts the recharging tank SRic in communication with the valve V9.

The pump P1 is started, the valve V13 is opened, sucking water from the sea inlet AP1 and re-establishing the water level in the tank SRic and the operating pressure.

The reintegration tank SR, with the opening of the reduction valves V11 and V12, restores the initial gas masses in the tanks SL and SRic to compensate any possible leakages which may have occurred during the previous operations.

At this point, the device is ready for the emission of a new pressure impulse.

Figure 6:
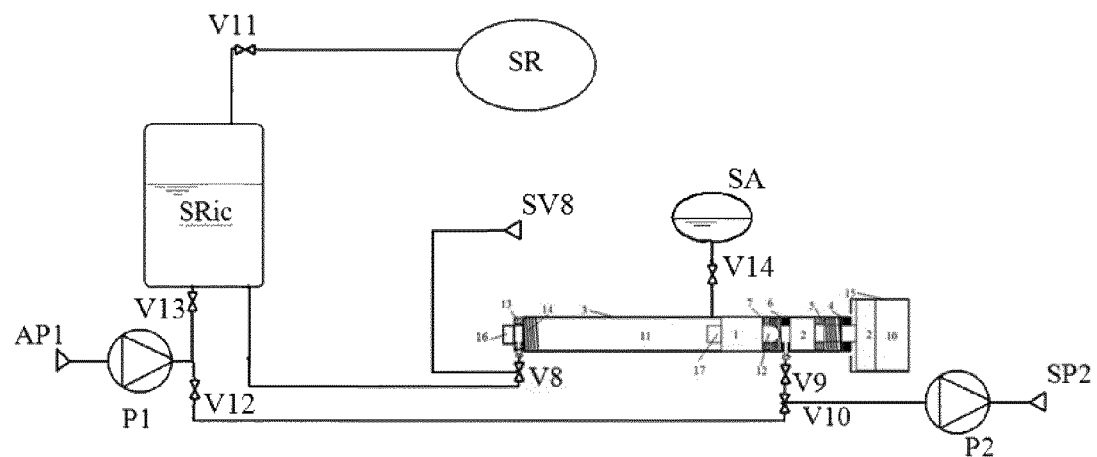
FIG. 6 represents a scheme of a second embodiment of the apparatus of the invention.

The second embodiment of the activation system, represented in FIG. 6, envisages activation means consisting of pressurized liquid.

This second embodiment overcomes the disadvantage of the previous gas activation system which has the risk, with prolonged use, that, as a result of the propulsion of the striker piston, the gas tank S1 may progressively lose pressure and gas mass due to leakage of the same gas. The pump piston, in fact, must operate under a considerable pressure difference, in the order of 50 bar, and gas leakages can be expected, even if in modest quantities, initially between the high-pressure thrust chamber and the interspace between the striker piston and the pump piston and subsequently between the thrust pipe and the marine environment through the pump piston.

The problem of leakage can represent a difficulty from a logistic point of view. If, in fact, in the plant described above, the activation gas is released into water, even in modest quantities, the necessity may arise of a refilling period of the tank SR should this drop to pressures close to 55 bar as a result of losses.

In order to eliminate this problem, the second embodiment of the activation system which is completely hydraulic, is described hereunder and represented in FIG. 6, in which the activation of the striker piston is directly effected by pressurized seawater instead of a gas.

In the phase prior to the thrust of the striker piston, the valve V8 blocks pressure communications towards the discharge SV8 into the marine environment, and also towards the tank (the only one in this case) SRic which exerts both the function of thrust tank and repositioning tank of the striker. The valve V9 is closed, the valve V10 blocks the pressure communication between V9 and the discharge SP2 and opens the communication between V9 and the valve V12 which is closed. The valve V13 is closed. The valve V14 is automatic and puts the cylinder 3 in communication with a gas damping tank SA to reduce water-hammer effects in correspondence with the impact between the striker piston 1 and the pump piston 2. The withholding electromagnet 16 is active, keeping the striker in position corresponding to the stops 13.

The thrust phase is activated with the opening of the valve V8 which puts the tank SRic in communication with the striker 1, excluding however the line which leads to the discharge SV8 into the marine environment. The piston 1 runs in the cylinder 3 until it strikes the pump piston 2 which emits the pressure impulse. The automatic valve V14 opens when the water-hammer starts in the pipe 3 blocking the propagation of high-pressure waves from the striker piston 1 towards the valve V8 due to the damper SA. At the end of this phase, the repositioning phase of the pump piston 2 is initiated. The valve V8 commutes, closing the line towards the tank SRic and opening the line towards the discharge SV8 into the marine environment, so that the pressure in the cylinder 3 drops to that of the same marine environment. The pump P1 is started, supplying a pressure slightly higher than that of the marine environment and regulated by means of the valve V12 and the valve V9 which is opened, allowing water to flow inside the cylinder 3. The striker piston withdraws towards the stops 13 until it reaches the final position buffered against the stops 13. The electromagnet 16 is activated keeping the position of the striker piston 1.

The valve V10 commutes on the pump P2 and closes the line towards the valve V12 which is closed. The pump P2 is started, emptying the cylinder 3 and discharging the water into the sea through the discharge SP2. The valve V9 is closed and the valve V10 commutes again closing the line towards P2 and opening that towards V12.

The pump P1 is started, the valve V13 is opened and water is pumped from the marine environment into the tank SRic through the sea inlet AP1 until the water level has been restored. The valve V13 is closed.

The reintegration tank SR, through the valve V11, re-establishes the air mass due to possible losses occurring during the previous phases.

In this phase, the activation system is ready for the emission of a new pressure impulse.

Figure 7:
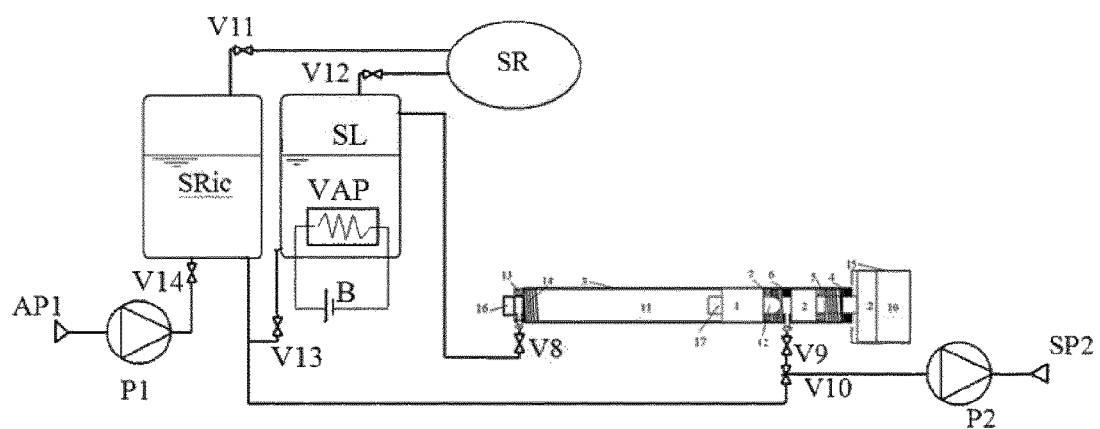
FIG. 7 represents a scheme of a third embodiment of the apparatus of the invention.

As an alternative to or in combination with the gas activation system, an embodiment of the activation system is envisaged, which allows the tank SL to be fed not only with the gas initially contained in the tank SL itself and possible reintegrations coming from the tank SR, but alternatively through the production of overheated vapour produced by means of a vaporizer fed by the same seawater. The scheme of the apparatus of the invention on which this activation system is assembled is represented in FIG. 7.

The functioning of the activation system is identical to that of the gas activation system represented in FIG. 5, except for the following modifications: (i) a partial filling of the thrust tank SL with seawater is effected; (ii) an electric vaporizer VAP is housed in the part of the tank SL filled with water, and the vaporizer is fed electrically by the battery B; (iii) there is a pressure reduction valve and water supply valve to the thrust tank SL to allow the vaporizer to be fed by means of water pumped from the pump P1 during the recharging phase of the tank SRic.

The vaporization of the water inside the tank SL allows possible gas and vapour losses due to leakage to be reintegrated during the functioning phase of the device. This vaporization system is capable of supplying the device with pressurized vapour for launching the striker piston 1 even if all the gas in the reintegration tank has been consumed, by simply providing the system with seawater through the pump P1.

Finally, the striker piston 1 can be activated by means of electromagnetic forces, using this method alone for the propulsion of the striker piston 1 or combined with the activation systems previously described.

Figure 8:
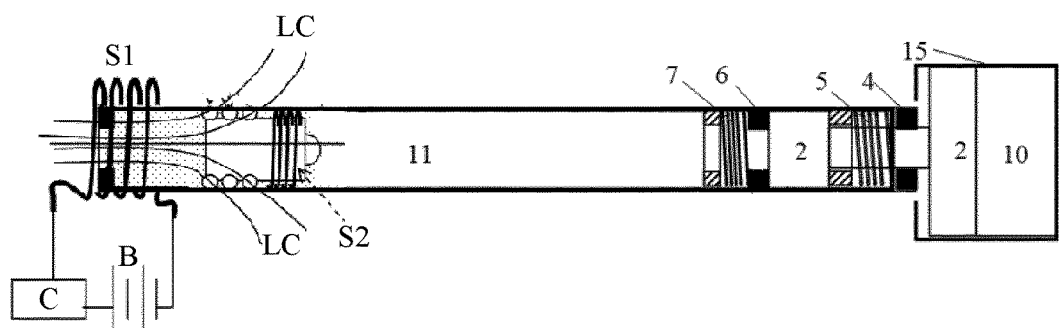
FIG. 8 represents a scheme of a fourth embodiment of the apparatus of the invention.

In principle, the cylinder 3, as in FIG. 8, is in this case equipped with a solenoid integral with it which generates a magnetic field inside the thrust pipe 3 with field lines LC also having a radial component, this coil forming the induction bobbin S1. The striker piston 1 is in turn equipped with an induced solenoid S2 with an axis again coinciding with the axis of the thrust pipe 3. A high-amperage current produced by the battery B, modulated through the control system C, is injected inside the solenoid S1, generating a variation in the magnetic field which induces a current in the induced solenoid S2 which thus generates on the same induced solenoid S2, by interaction with the field lines LC, a repulsive Lorentz force with an axial component suitable for accelerating the piston 1 along the thrust pipe 3 from left to right until causing an impact on the pump piston 2. The control system of the current is also capable of piloting the electromagnetic forces, after the impact, in the opposite direction, moving the striker piston from right to left, thus returning it to its initial position.

In the case of an electromagnetic activation of the striker piston 1, as this does not have to guarantee a pressurized air tightness, this flows in the thrust pipe by means of roll or ball bearings with very low friction favouring the mechanical efficiency of the device, and the piston 1 itself can be completely perforated and have a smaller diameter than the diameter of the cylinder 3, thus allowing the passage of air through and around the piston 1, avoiding attenuation effects of the impact with the piston 2 due to the presence of an air cushion between the striker piston and the pump piston.

The invention claimed is:

1. An apparatus for the generation of pressure waves in an underwater environment comprising:
   a cylinder, defining an axis, in which a striker piston and a pump piston are situated, each having two respective opposite sides with respect to said axis, of which a side of the striker piston situated in front of the pump piston is defined first impact side, and a side of the pump piston in front of the striker piston is defined second impact side, the pump piston and the striker piston sliding in the cylinder in a direction parallel to the axis, and the pump piston and striker piston being such as to strike against each other, by means of the first and the second impact sides, the striker piston being driven by an activation system using activation means pressing on the side opposite to its own impact side; and
   a chamber at one end of the cylinder having a diameter larger, smaller or equal to that of the portion of cylinder in which the striker piston is housed, wherein in said chamber a part of the pump piston can slide, in communication with the water of the underwater environment, so as to transmit an impulse generated by said impact against the underwater environment; and
   wherein the activation means of the striker piston is selected from: a gas and/or water vapour, or pressurized liquid, and/or electromagnetic forces and the activation system comprises:
   for gas as activation means: a thrust tank, which contains pressurized gas for feeding the striker piston, a recharging tank, which contains gas for feeding the thrust tank, and a reintegration tank, which contains gas for restoring initial gas masses in the recharging tank and thrust tank;
   for pressurized liquid as activation means: a recharging tank, which contains pressurized liquid that is discharged to the striker piston, and a reintegration tank, which contains gas for restoring air mass in the recharging tank;
   for water vapour as activation means: a thrust tank, which contains pressurized gas for feeding the striker piston, in which an electric vaporizer is placed, a recharging tank, which contains gas for feeding the thrust tank, and a reintegration tank, which contains gas for restoring initial gas masses in the recharging tank and thrust tank;
   for electromagnetic forces as activation means: a solenoid integral with the cylinder and an induced solenoid with which the striker piston is equipped with its axis coinciding with the axis of the cylinder.

2. The apparatus according to claim 1, wherein the pump piston comprises a series of bodies integral with each other, of which a first body slides in the cylinder and a second body slides in the chamber.

3. The apparatus according to claim 1, wherein pressure regulation means of the activation means of the striker piston are envisaged, in order to modify the sound emission characteristics of the apparatus itself.

4. The apparatus according to claim 1, wherein generation means of Lorentz electromagnetic forces are envisaged for thrusting the striker piston towards the pump piston through magnetic fields generated by electric circuits integral with the cylinder and electric circuits integral with the striker piston.

5. A method for the generation of pressure waves in an underwater environment effected by means of the apparatus according to claim 1 comprising the following steps: a) the striker piston is thrust against the pump piston, through the pressure of gas, vapour, or liquid activation means or electromagnetic forces inside a volume of the cylinder, in contact with the side of the striker piston opposite the impact side, until impact is caused on the pump piston, generating an impulse; b) the pump piston transmits the impulse to the water of the underwater environment creating a pressure wave by means of the side opposite to the impact side; c) the pump piston slows down until it stops, due to the pressure generated on its surface by the sea water, terminating the sound emission process.

6. The method according to claim 5, wherein gas, vapour or liquid activation means after the impact are expelled from the volume by means of pressure energy of a liquid injected between the impact side of the striker piston and the impact side of the pump piston.

7. The method according to claim 5, wherein the activation means are a pressurized gas or vapour generated by the vaporization of a liquid.

8. The method according to claim 5, wherein the activation means are a pressurized fluid.

9. The method according to claim 7, wherein the pressurized gas or vapour which, after the expansion undergone following the run of the pistons, is recompressed by means of pressure energy accumulated in the recharging tank containing a gas and a liquid, and wherein the energy is supplied by a system of pumps which inject liquid compressing the gas contained therein.

10. The method according to claim 7, wherein the pressurized gas or vapour which, after the expansion undergone following the run of the pistons, is recompressed by the retrograde movement of the striker piston, which takes place along the cylinder in the opposite direction with respect to that relating to the expansion phase of the gas of a thrust tank, the movement of the striker piston being generated by the action of the pressure of liquid contained in a recharging tank, wherein the pressure is maintained at higher values with respect to that in force in the thrust tank by means of the action of the pumps.

* * * * *